United States Patent [19]

Caravito et al.

[11] 4,287,927
[45] Sep. 8, 1981

[54] MULTIPLE RING TIRE

[75] Inventors: Vito A. Caravito, Uniontwon; Grover W. Rye, Cuyahoga Falls, both of Ohio

[73] Assignee: The Goodyear Tire & Rubber Company, Akron, Ohio

[21] Appl. No.: 137,470

[22] Filed: Apr. 4, 1980

Related U.S. Application Data

[63] Continuation of Ser. No. 921,061, Jun. 30, 1978, abandoned.

[51] Int. Cl.³ .............................................. B60C 7/00
[52] U.S. Cl. ........................................ 152/302; 152/7; 152/209 R
[58] Field of Search ............... 152/7, 49, 50, 209 R, 152/209 A, 209 WT, 209 NT, 300, 302, 303, 306, 307, 310, 319, 320, 47, 324, 326, 333, 339, 69, 73, 398, 402; 301/41 R, 52, 53, 13 SM, 36 R, 36 WP

[56] References Cited

U.S. PATENT DOCUMENTS

| | | | |
|---|---|---|---|
| 2,620,844 | 12/1952 | Lord | 152/326 |
| 2,742,941 | 4/1956 | Johnson | 152/326 |
| 2,751,959 | 6/1956 | Blomquist | 152/376 X |
| 3,890,010 | 6/1975 | Dove, Jr. | 301/52 |

FOREIGN PATENT DOCUMENTS 238419  9/1911  Fed. Rep. of Germany ...... 152/310

Primary Examiner—William A. Powell
Assistant Examiner—Thomas Bokan
Attorney, Agent, or Firm—Frederick K. Lacher; Frank Pincelli

[57] ABSTRACT

A tire having axially spaced rings of elastomeric material with different spring rates and tread configurations to provide variable operating characteristics at axially spaced positions across the tire. Each of the rings has an inner bead portion and an outer belt portion connected by a load-carrying and cushioning intermediate structure which may have radially extending strap members reinforced by a ply of reinforcing cords.

6 Claims, 4 Drawing Figures

MULTIPLE RING TIRE

This is a continuation of application Ser. No. 921,061 filed June 30, 1978 now abandoned.

This invention relates generally, as indicated, to a tire of the type in which cushioning and support is provided by radially extending wall members.

Heretofore tires of this type such as those described and shown in copending patent application Ser. No. 920,666 now U.S. Pat. No. 4,235,270 entitled "Tire With Supporting and Cushioning Walls" assigned to the assignee of this application have been provided in which the tire has been a unitary body which is mounted on the wheel. This has limited the application of the tire to a particular use and required the manufacture and inventoring of a number of different tires to meet the different operating conditions required by the customer. For example, it is desirable to have different tread configurations at the center of the tire than at the edges and it is also desirable to have different spring rates at the center than at the edges of the tire for certain applications. It is also desirable to have different widths of the tire depending upon the load and terrain over which the vehicle is to be operated.

An object of this invention is to provide a tire construction in which axially spaced rings can be combined to provide a variation in spring rate across the tire.

Another object is to provide rings having different tread configurations which can be combined to provide the traction requirements for specific operating conditions.

A further object is to provide different spring rates by utilizing rings having different numbers of radially extending, flexible, resilient strap members connecting the outer belt and inner bead portions.

A further object is to provide a tire with center rings interposed between side rings and having a higher spring rate than the side rings.

Another object is to provide spacers between the rings to prevent contact of the rings with adjacent rings during operation.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
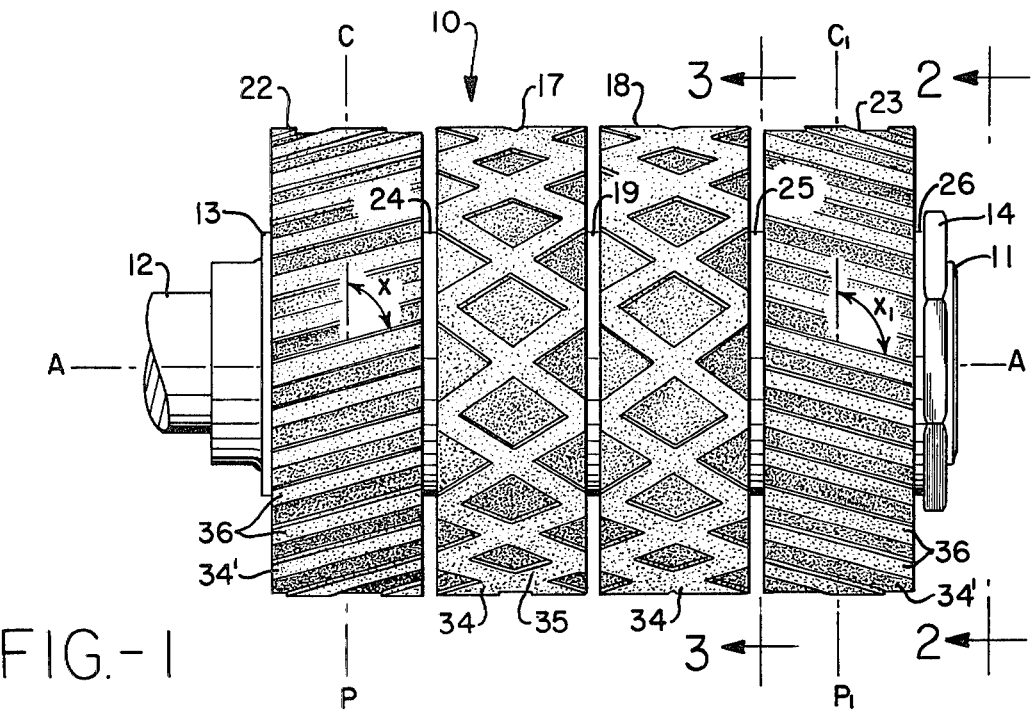
FIG. 1 is an elevation of a tire of this invention mounted on a wheel.
Figures 2, 3:
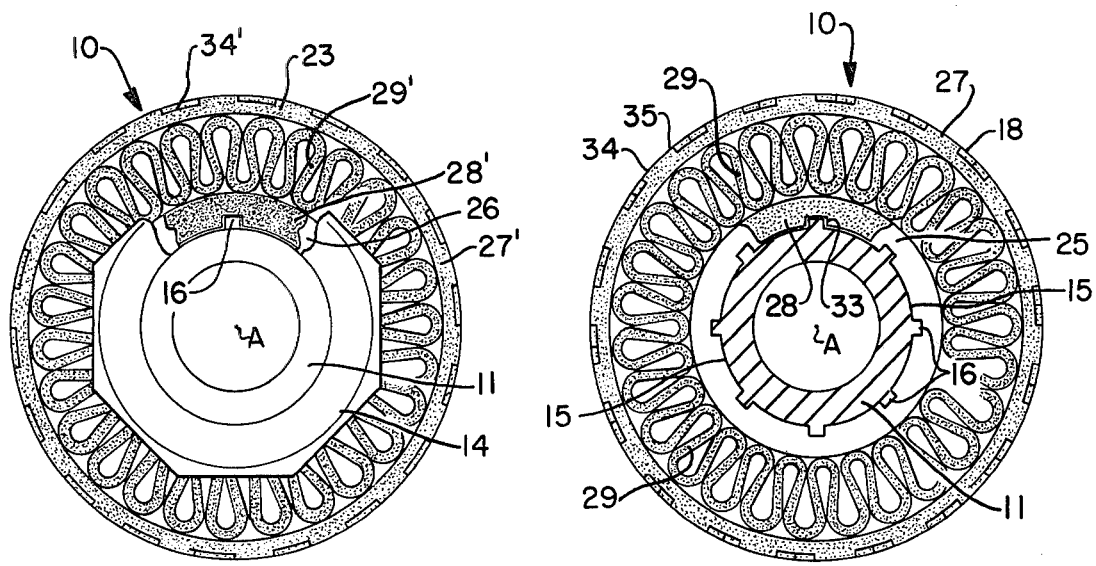
FIG. 2 is a sectional view taken along the plane of line 2—2 in FIG. 1 with parts being broken away.
FIG. 3 is a sectional view taken along the plane of line 3—3 in FIG. 1 with parts being broken away.
Figure 4:
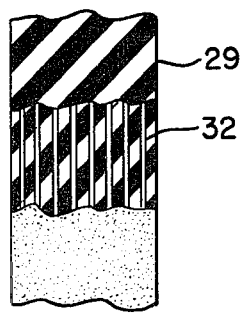
FIG. 4 is a fragmentary view of the strap member for one of the cushioning and supporting rings with parts broken away to show the reinforcement of the straps.

Referring to FIGS. 1, 2 and 3, a nonpneumatic tire and rim assembly is shown in which a tire 10 is mounted on a cylindrical rim 11 connected to an axle 12 rotatable about an axis AA. The rim 11 may have a tire-engaging flange 13 at one end and be threaded at the other end for receiving a retaining nut 14. The rim 11 is preferably of a substantially rigid material such as steel and has a tire-supporting surface 15 on which are positioned transversely extending ribs 16 at spaced-apart positions circumferentially of the rim. The tire 10 is mounted on the rim 11 in a manner similar to that described in copending U.S. patent application Ser. No. 920,668 now U.S. Pat. No. 4,226,273 on Nonpneumatic Tire and Rim Assembly assigned to the assignee of this application.

The tire 10 has a pair of central annular elements such as central rings 17 and 18 which are spaced apart axially by a spacer 19 of sufficient width to prevent contact of the central ring during normal operation. Tire side elements such as side rings 22 and 23 are mounted on the rim 11 at positions spaced axially from the central rings 17 and 18, respectively, and spacers 24 and 25 are positioned between the central rings and the side rings to prevent contact of the rings during normal operation. A spacer 26 is positioned between the nut 14 and side ring 23 so that the nut will engage the spacer and not contact the side ring during operation.

The central rings 17 and 18 and the side rings 22 and 23 are of resilient elastomeric material or moldable polymeric material such as natural rubber, styrene butadiene rubber, polybutadiene rubber or EPDM rubber or a blend of two or more of these rubbers which can be utilized in either injection molding or compression molding. The central ring 18 which has the same construction as central ring 17 includes a generally cylindrical outer member or belt portion 27 at the outer periphery and a generally cylindrical member or bead portion 28 at the inner periphery. Connecting the belt portion 27 and bead portion 28 is a load-carrying and cushioning intermediate structure including a plurality of generally radially extending, flexible, resilient strap members 29. In this embodiment the strap members 29 are made from one elongated strap arranged in a sinuous configuration between the bead portion 28 and belt portion 27 with the strap looped at portions connected to the members. The strap members 29 may be reinforced by a ply 32 of reinforcing cords embedded in the elastomeric material of the strap members and forming a composite laminate of the reinforcing cords of the ply. The cords of the ply 32 may be of a reinforcing material generally used in tires such as nylon or aramid.

The belt portion 27 may be reinforced by one or more plies of reinforcing cords (not shown) which may also be of a reinforcing material generally used in tires such as nylon or aramid to form a belt and prevent any appreciable increase in the circumference of the belt portion 27. The bead portion 28 may also be reinforced by a ply of reinforcing cords (not shown) of a reinforcing material such as steel wire which may extend in a generally circumferential direction and prevent any appreciable increase in the circumference of the bead portion. As shown in FIG. 3, transverse grooves 33 at the inner peripheral surface of the bead portion 28 are provided for positioning over the ribs 16 of the rim 11 to prevent relative rotation of the rim and the central ring 18.

A tread portion 34 is provided on the outer periphery of the belt portion 27 and in this embodiment includes tread bars 35 arranged in a crossed pattern for engaging the road surface or other terrain over which the vehicle is designed to operate.

Referring to FIGS. 1 and 2, a side ring 23 is shown which has the same construction as side ring 22 and a similar construction to central rings 17 and 18 except for modifications in the strap members 29', tread portion 34' and elastomeric material of the ring.

The strap members 29' of side ring 23 may be of a more resilient material than the material of the central ring strap members 29 to provide a spring rate of the side rings which is lower than the spring rate of the central rings. As shown in FIG. 2, the side ring 23 has fewer strap members 29' than the central ring 18 which will also result in a spring rate of the side rings which is lower than the spring rate of the central rings.

As shown in FIG. 1, the tread portion 34' of the side ring 22 has parallel straight bars 36 extending transversely of the side ring at an angle X of around 75 degrees to the centerplane CP of the side ring 22. The side ring 23 which has the identical construction as side ring 22 is mounted with the bars 36 extending in the opposite direction from the bars of the side ring 22 so that the corresponding angle X1 of the bars to the centerplane C1P1 of the side ring 23 is around 115 degrees.

In this embodiment, center rings 17,18 and side rings 22,23 have substantially the same widths which may be from three-quarters of an inch to two inches; however, it is understood that the widths of the rings may be varied to obtain different operating characteristics transversely of the tire 10. Also in this embodiment four rings 17, 18, 22 and 23 are shown; however, the rim 11 may have a greater length and additional rings may be added to provide greater traction or floatation capabilities of the tire. The tread portion 34 of the central rings 17 and 18 and the tread portion 34' of the side rings 22 and 23 in the embodiment shown in FIG. 1 provides greater traction at the center of the tire and less traction at the edges but provides greater cleaning ability at the edges than at the center. It is understood that the tread portion 34 and 34' of the rings 17, 18, 22 and 23 may be the same throughout or be changed to provide greater traction or cleaning properties depending upon the requirements of the vehicle on which the tire is mounted. It will also be evident than when one of the rings 17, 18, 22 and 23 is damaged the tire can be repaired by replacing that ring and replacement of the complete tire is not required.

While a certain representative embodiment and details have been shown for the purpose of illustrating the invention, it will be apparent to those skilled in the art that various changes and modifications may be made therein without departing from the invention.

We claim:

1. A tire and rim assembly comprising a rim of substantially rigid material connected to an axle and rotatable about an axis, said rim having a tire-supporting surface, a tire of resilient elastomeric material including a pair of annular side elements mounted on said tire-supporting surface, an annular central element mounted on said tire-supporting surface, said central element being interposed between and axially spaced apart from said side elements, each of said side elements and said central element having a radially outer belt portion, a radially inner bead portion and a load-carrying and cushioning intermediate structure positioned between said inner bead portion and said outer belt portion, said intermediate structure having a plurality of generally radially extending flexible resilient strap members connected to said outer belt portion and to said inner bead portion, and each of said side elements having a spring rate which is not equal to the spring rate of said central element.

2. A tire and rim assembly comprising a rim of substantially rigid material connected to an axle and rotatable about an axis, said rim having a tire-supporting surface, a tire of resilient elastomeric material including a pair of annular side elements mounted on said tire-supporting surface, an annular central element mounted on said tire-supporting surface, said central element being interposed between and axially spaced apart from said side elements, each of said side elements and said central element having a radially outer belt portion, a radially inner bead portion and a load-carrying and cushioning intermediate structure positioned between said inner bead portion and said outer belt portion, said intermediate structure having a plurality of generally radially extending flexible resilient strap members connected to said outer belt portion and to said inner bead portion, and said intermediate structure of each of said side elements having a different number of said strap members than the strap members in said intermediate structure of said central element to provide a spring rate of said side elements which is not equal to the spring rate of said central element.

3. A tire and rim assembly comprising a rim of substantially rigid material connected to an axle and rotatable about an axis, said rim having a tire-supporting surface, a tire of resilient elastomeric material including a pair of annular side elements mounted on said tire-supporting surface, an annular central element mounted on said tire-supporting surface, said central element being interposed between and axially spaced apart from said side elements, each of said side elements and said central element having a radially outer belt portion, a radially inner bead portion and a load-carrying and cushioning intermediate structure positioned between said inner bead portion and said outer belt portion, said intermediate structure having a plurality of generally radially extending flexible resilient strap members connected to said outer belt portion and to said inner bead portion, each of said strap members having at least one ply of reinforcing cords embedded in said elastomeric material, and said intermediate structure of each of said side elements having a different number of said strap members than the strap members in said intermediate structure of said central element to provide a spring rate of said side elements which is not equal to the spring rate of said central element.

4. A tire and rim assembly comprising a rim of substantially rigid material connected to an axle and rotatable about an axis, said rim having a tire-supporting surface, a tire of resilient elastomeric material including a pair of annular side elements mounted on said tire-supporting surface, an annular central element mounted on said tire-supporting surface, said central element being interposed between and axially spaced apart from said side elements, each of said side elements and said central element having a radially outer belt portion, a radially inner bead portion and a load-carrying and cushioning intermediate structure positioned between said inner bead portion and said outer belt portion, each of said side elements and said central element having a tread portion on the radially outer periphery of said outer belt portion, and said tread portion of said central element having a different configuration than said tread portion of each of said side elements to provide unequal traction at axially spaced positions across the tire.

5. A tire and rim assembly according to claim 4 wherein a second annular central element is mounted on said wheel adjacent said first-mentioned central element and is interposed between and axially spaced from said side elements, said second central element and said side elements having separate operating characteristics and one of said operating characteristics of said side elements not being equal to the same operating characteristic of said second central element.

6. A tire and rim assembly according to claim 5 wherein said first-mentioned central element and said second central element have equal operating characteristics.

* * * * *